Sept. 12, 1944.  G. R. ANDERSON  2,357,923
VENTILATION OF ELECTRICAL MACHINES
Filed June 29, 1942  3 Sheets-Sheet 1

INVENTOR.
GORDON R. ANDERSON
BY
ATTORNEY

Sept. 12, 1944.   G. R. ANDERSON   2,357,923
VENTILATION OF ELECTRICAL MACHINES
Filed June 29, 1942   3 Sheets-Sheet 2

INVENTOR.
GORDON R. ANDERSON
BY
ATTORNEY

Sept. 12, 1944.                G. R. ANDERSON                2,357,923
VENTILATION OF ELECTRICAL MACHINES
Filed June 29, 1942                    3 Sheets-Sheet 3

INVENTOR.
GORDON R. ANDERSON
BY
ATTORNEY

Patented Sept. 12, 1944

2,357,923

UNITED STATES PATENT OFFICE 2,357,923

VENTILATION OF ELECTRICAL MACHINES

Gordon R. Anderson, Beloit, Wis., assignor to Fairbanks, Morse & Co., Chicago, Ill., a corporation of Illinois Application June 29, 1942, Serial No. 448,933

9 Claims. (Cl. 171—252)

This invention relates to electrical machines, and has particular reference to improved ventilation of substantially enclosed dynamoelectric machines for effecting adequate and efficient cooling of such machines.

The principal object of the invention resides in the provision of an improved frame or housing construction for a dynamoelectric machine of enclosed or protected type, which affords effective ventilation for cooling the operating parts of the machine, the ventilation being attained by a novel construction and arrangement of the frame members such that there is effected reversed or oppositely directed air streams in the end zones of the machine and longitudinally over the periphery of the machine stator assembly.

Another object of the invention is to provide a machine of substantially enclosed character which is ventilated and cooled in a positive, efficient and direct manner, and which by reason of the improved frame construction, is substantially drip-proof and splash-proof.

A further object is to provide an improved enclosing housing structure for dynamoelectric machines, having substantially identical end closure and rotor shaft supporting members each of which is characterized by localized air inlet and outlet openings and separate air passages therein communicating respectively with the openings, wherein the end closures are readily interchangeable and capable of assembly to the intermediate frame member of the housing in any one of several positions angularly about the machine axis, whereby the machine may be thus readily adapted for floor, wall or ceiling mounting without adverse effect upon its positive ventilation and drip- and splash-proof characteristics.

Yet another object resides in the provision in an improved machine of the character indicated, of an improved arrangement for effecting electrical connection to the machine through a conduit box advantageously located at one side of the housing and intermediate the housing ends, or through a conduit connection adjacent said box and near the under side of the housing.

Further objects and advantages will appear readily from the following description of a preferred embodiment of the invention as exemplified in the accompanying drawings, wherein.

Figure 1:
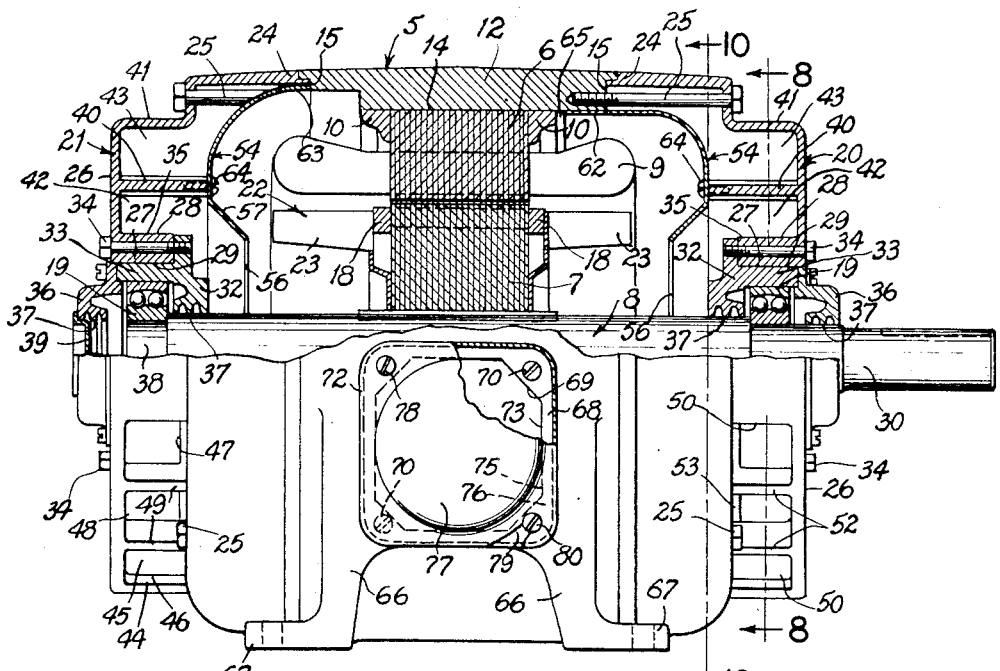
Fig. 1 is a longitudinal side elevation of a dynamoelectric machine embodying the features of the present invention, with portions thereof shown in section to illustrate certain of these features.

Referring now to the drawings by appropriate characters of reference, the numeral 5 designates generally a dynamoelectric machine embodying the improvements of the present invention. For the purposes of the present exemplary disclosure, the machine herein illustrated may be an induction motor having a wound stator 6 and a squirrel-cage rotor 7 suitably secured upon a rotor shaft 8. The stator 6 is of annular form and is comprised by preference, of iron laminations slotted to receive the stator windings 9. According to the present example, these laminations are held in assembly by side rings 10 joined by equally angularly spaced bridge elements or bars 11 extending over the stator periphery. The side rings and bars may be cast or welded integrally about the laminated stator to effect a positive clamping of the laminations between the rings 10, while thereby avoiding any necessity for separate securing elements as bolts or the like.

Figure 7:
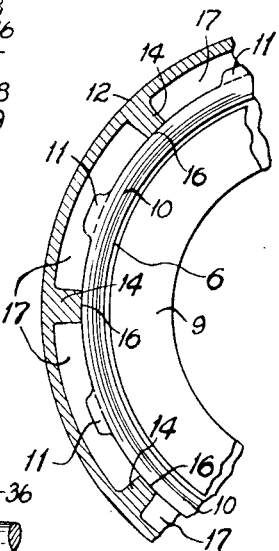
Fig. 7 is a fragmentary section through the stator and frame of the machine, as viewed from line 7—7 in Fig. 4.

Supporting the stator assembly 6 is an annular frame 12 which is provided on its inner surface with a plurality of projections or ribs 14 each extending longitudinally between the opposite flanged frame end shoulders 15. These ribs are equally spaced about the inner periphery of the frame, and each has its inner face 16 curved to a degree corresponding to the peripheral curvature of the stator 6. In the stator frame assembly, the stator has a press-fit engagement with the rib surfaces 16 and is centrally positioned in the frame such that the stator bars 11 are disposed substantially mid-way between adjacent frame ribs 14. It thus will appear from Figs. 4, 5 and 7 in particular, that the stator 6 is uniformly spaced radially inwardly of the frame 12, and that the frame, ribs 14 and periphery of the stator cooperate to provide a plurality of separate passages 17 each extending longitudinally of the stator, and all equally spaced about the stator periphery. These passages 17 serve to conduct cooling air over the stator periphery, as this will appear more fully hereinafter.

Figure 6:
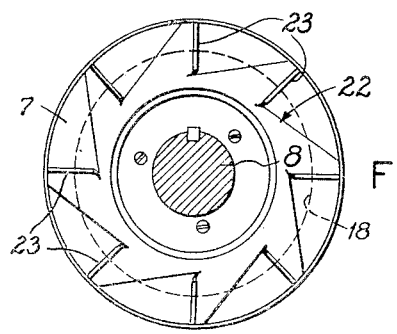
Fig. 6 is an end elevation of the machine rotor showing air impelling means thereon, the view being taken from the line 6—6 in Fig. 4.

The rotor 7 is of the squirrel-cage type, having winding bars (not shown) in the peripheral portion thereof, which are electrically united by conductor end rings 18 at the opposite sides of the rotor. Operatively supporting the rotor is the shaft 8 which is journalled in suitable friction-reducing bearings 19 carried by the opposite frame end-closure members 20 and 21 hereinafter to be described. Suitably secured to each end face of the rotor 7, is an air impeller 22 (Figs. 1 and 6), which may be a one-piece member formed as from sheet metal, to provide a plurality of impeller blades 23. As will appear from Figs. 1 and 4 in particular, the largest diametral dimension of each of the impellers 22 is somewhat less than the diameter of the rotor 7 at its periphery, so that the rotor assembly may be readily axially displaced from either side of the stator 6, into or out of operative association with the latter without interference by the impellers. It will now be seen that the impellers 22, during rotation, serve to induce a flow of cooling air through the several passages 17, this expression being employed in the broad sense, denoting either an air flow by suction, or a positively impelled air stream of positive pressure characteristics.

Figure 8:
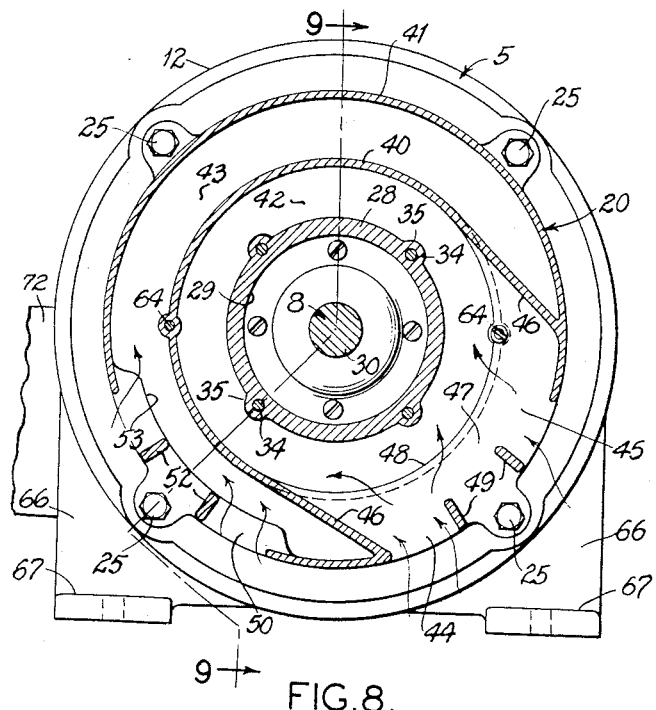
Fig. 8 is a sectional elevation transversely through a frame end closure member, as taken along the line 8—8 in Fig. 1.

According to the presently preferred embodiment of the invention, the end-closure members 20 and 21 are substantially identical in form and construction, so that a full description of one will suffice for both with the same reference characters applying to the corresponding parts thereof. The closure member or frame end bell 20, being that at the right hand end of the motor frame as viewed in Fig. 1, is of generally deep cup or bell shape, and has its rim formed to present a flanged shoulder 24 for assembly engagement with the flanged shoulder 15 of the motor frame 12. Suitable bolts 25 serve to secure the member to the frame, and although not shown, gasket means may be provided at the shouldered joint 15—24 to assure a fluid-tight connection thereof. The outer wall 26 of the closure is centrally apertured at 27, and formed integrally with said wall is an annular wall element 28 which extends inwardly of the member to define with the aperture 27, a bearing bore 29 through which the end portion 30 of the shaft 8 projects. A bearing collar 32 about the shaft portion 30 and within the member 20, provides an annular flange 33 adapted for seating in the bore 29 in centering engagement with the wall element 28 (Fig. 1), the collar flange 33 serving as a mounting seat for an anti-friction bearing 19 preferably of ball-race type as shown, providing the rotative support for the shaft portion 30. The collar 32 is retained in assembly to the member 20 by suitable bolts 34 extending through enlarged portions 35 of the wall element 28 (Fig. 8). Completing the bearing assembly is an external bearing cap 36 suitably secured to the wall 26 of member 20, the cap serving to retain the bearing 19 in place and affording a closure for the aperture 27 about the motor shaft. As will be observed, the shaft bores 37 of the bearing collar 32 and cap 36 are internally grooved to receive packing means as felt or other sealing material, to seal the shaft extension therethrough. In the present example, the shaft portion 30 is projected outwardly beyond the cap 36 to provide for motor drive connection to a driven device (not shown), while the opposite end 38 of the shaft 8 terminates in the bearing 19 of the end closure 21. In the latter instance, the bore 37 of the end cap 36 may be closed and effectively sealed by a cap plate or flanged disc 39.

Figure 4:
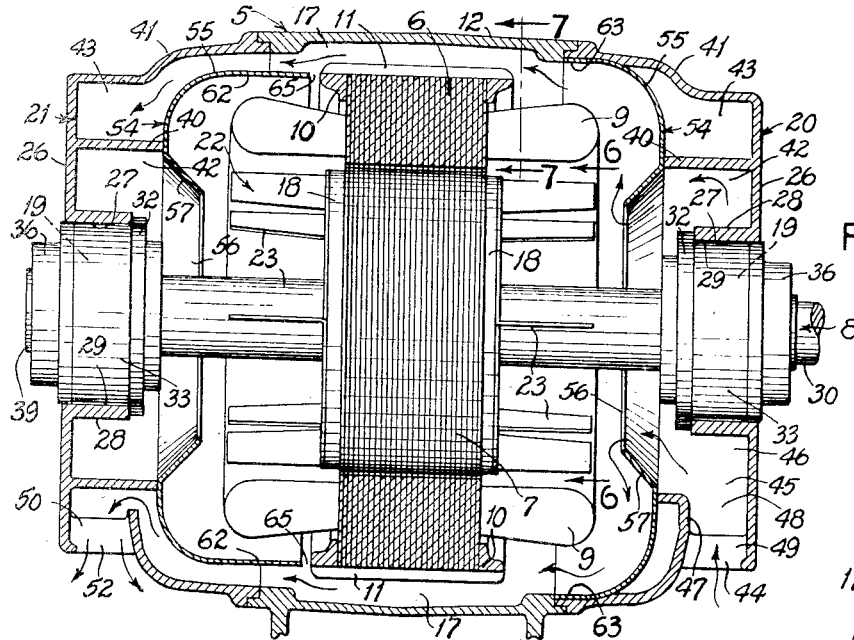
Fig. 4 is a longitudinal sectional elevation of the machine, as viewed from line 4—4 in Fig. 2.
Figure 9:
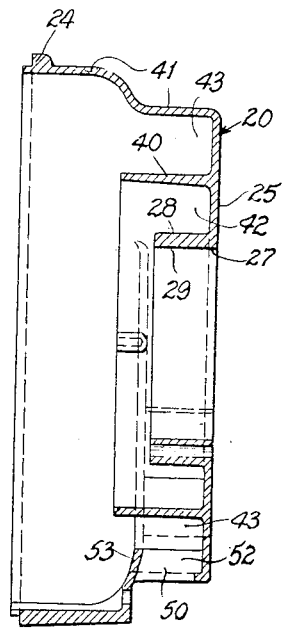
Fig. 9 is a longitudinal section of the closure member, as taken from the line 9—9 in Fig. 8.

With particular reference to Figs. 4, 8 and 9, the closure member 20 is formed to provide an annular wall 40 projecting inwardly from the outer closure wall 26 to a somewhat greater extent than wall element 28, and located intermediate the latter wall element and the peripheral wall portion 41 of member 20. The walls 40 and 28 serve to define with the outer wall 26, an annular channel 42 opening to the interior of the member 20, while the walls 40, 26 and 41 cooperate to define a similar annular channel 43 about the channel 42. Located in the lower right hand quadrant of the member 20 (Fig. 8) is an opening 44 through the wall portion 41, which constitutes an air inlet to the inner channel 42. Communication between the inlet opening 44 and channel 42 is effected by a passage 45 which is defined by side wall elements 46 between the annular walls 40 and 41, the outer wall 26, and an inner transverse wall element 47 across the channel 43, the passage terminating in an opening 48 provided in the wall 40. Strengthening cross-pieces or webs 49 may be provided between the walls 26 and 47 in the zone of the inlet opening 44, and these may serve additionally, as deflectors for water or other liquid sprayed or splashed toward the opening.

Communication between the outer channel 43 and the exterior of the closure member 20 is effected by an opening 50 in a portion of wall 41 in the lower left hand quadrant of member 20 (Fig. 8), this opening constituting an air outlet for the discharge of air from the channel 43. Cross-pieces or webs 52 similar in form and purpose to the webs 49 above described, are provided in the outlet opening 50 to extend between the outer wall 26 and a flange 53 directed inwardly from the peripheral wall portion 41 of member 20, as clearly appears in Figs. 5 and 8.

Figure 11:
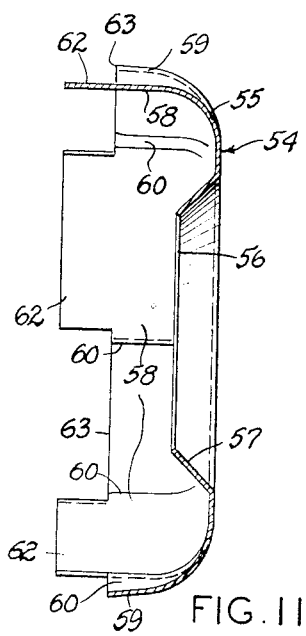
Fig. 11 is a longitudinal sectional elevation of a baffle member employed in the machine.

In order to isolate the air inlet and outlet channels 42 and 43 one from the other, and to provide in conjunction with the frame passages 17 heretofore described, for definite paths of air travel through the machine between the air inlet and outlet openings at the ends of the motor casing, novel baffle means are provided in each of the end closure members 20 and 21. The baffle of the preferred form as illustrated particularly by Fig. 11, is preferably a unitary member 54 of annular, dish-shaped configuration providing a curved body portion 55 having a central aperture 56 defined by the inner margin of a frusto-conical flange element 57. The body 55 is formed to provide a plurality of alternate inset and outset wall elements or sectors 58 and 59 respectively, each joined to the other along the adjacent sides thereof by a wall element 60. Moreover, the inset wall elements 58 have their forward end portions 62 projected beyond the forward margins 63 of the outset wall elements 59, as is clearly shown in Fig. 11. The total number of sectors 58 and 59 contained by the baffle member equals the number of frame passages 17, this for a reason which will presently appear.

Figure 5:
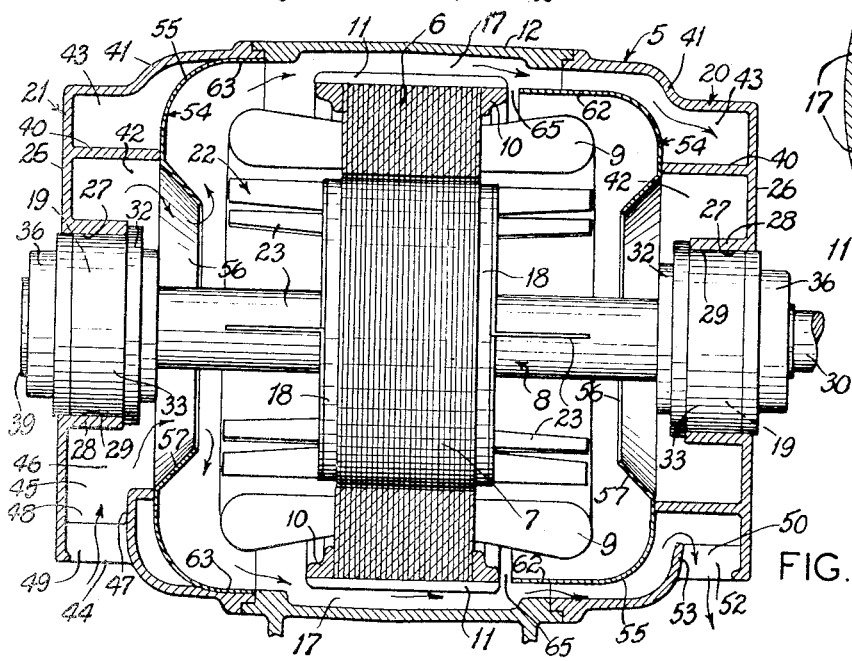
Fig. 5 is a sectional view similar to that of Fig. 4, but as taken from the line 5—5 in Fig. 2.
Figure 10:
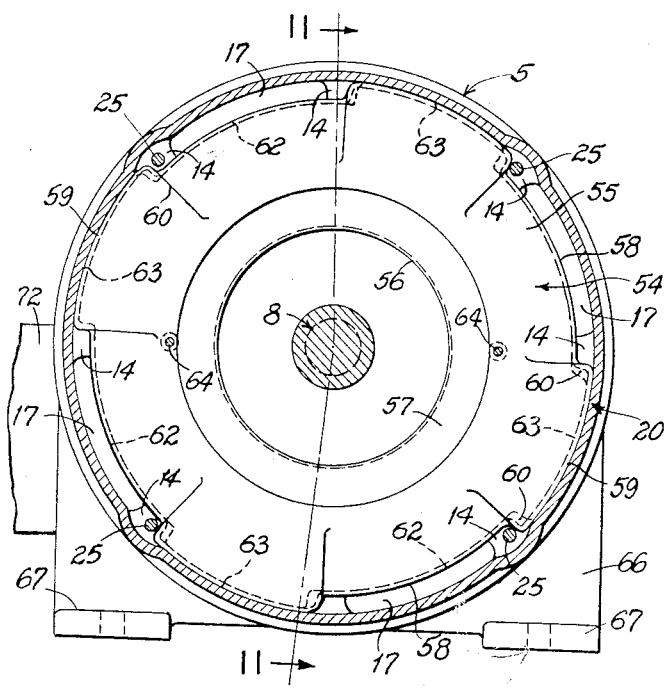
Fig. 10 is a further sectional elevation transversely through the closure member, as viewed from line 10—10 in Fig. 1.

One of the baffle members 54 is received in the end-closure member 20, as shown in Figs. 4, 5 and 10, such that the body portion 55 adjacent the base of the conical flange 57 engages closely and uniformly about the annular edge of the wall 40, to which it may be secured as by suitable screws 64 (Fig. 1). If desired, the baffle 54 may be detachably secured in a suitable manner (not shown), to the frame 12, instead of the illustrated screw attachment thereof to the wall 40. Further, the forward portion 63 of each of the outset wall elements 59 closely engages the adjacent inner marginal surface of peripheral wall 41 of the closure member 20, as shown in Fig. 4. The form of the baffle 54 and its arrangement in the member 20 are such that in the motor assembly, each of the baffle wall elements or sectors 58 and 59 cooperates with one of the frame passages 17 in the manner illustrated by Figs. 4, 5 and 10. As therein shown, the forward margin 63 of each outset sector 59 abuts the frame shoulder 15 between an adjacent pair of frame ribs 14, so that the inner surface of the sector merges smoothly with the inner surface of the frame in the zone of one of the frame passages 17. With respect to the inset baffle sectors 58 which are extended beyond the outset sectors, the forward margin of each of these sectors is disposed relatively adjacent the stator assembly ring 10 (Fig. 5) such that its external marginal surface is substantially in surface registry with the peripheral surface of the stator core 6. A relatively small spacing of the forward margins of baffle sectors 58 from the stator ring 10, is thus provided to effect a narrow slit or opening 65 serving a purpose presently to appear. Fig. 10 in particular, clearly shows the relation of the baffle to the stator frame and passages 17, it being noted that the baffle sector dividing walls 60 are longitudinally aligned with the frame ribs 14 and cooperate therewith in providing separate air flow passages through the motor housing. As will now readily appear, the baffle 54 cooperates with the end closure member 20, the stator 6 and the stator frame, to provide separate paths for air flow between the inlet and outlet openings 44 and 50 and the stator passages 17. The arrangement is such that air drawn through the inlet opening 44 of the right hand end closure 20 (Fig. 4), into the circular channel 42, as effected by the impeller 22 on the end of rotor 7 adjacent the closure 20, will be directed through the baffle opening 56 by the conical flange 57, to the impeller 22, from whence the air under forced draft will flow about the adjacent end surfaces of the stator assembly and will be directed by the outset baffle wall sectors 59, into and through the stator passages 17 with which the said baffle sectors are associated. Air under forced draft from the opposite end closure member 21, and flowing through the remaining frame passages 17, will be directed by the inset baffle wall sectors 58 (Fig. 5), into the outer circular channel 43 in member 20, for discharge through the outlet opening 50. As will appear from Figs. 4 and 5 in particular, the openings 65 afford communication between the space about the end surfaces of the stator and the passages 17 with which the inset baffle segments 58 are associated, so as to provide for by-passing a small part of the air flow from the fan 22 and about the stator coils 9, directly into the above noted passages 17 for discharge without first passing over the stator periphery. These openings 65 which may be termed bleeder openings, have been found to increase the effectiveness of the present ventilation arrangement.

With respect to the opposite end closure 21, the baffle member 54 therein is angularly displaced relative to the baffle member 54 in closure member 20, to an extent such as to align the outset wall sectors 59 thereof with those stator passages 17 with which are associated the inset sectors 58 of the opposite baffle in member 20, as this readily appears in Fig. 5. A like relationship obtains between the inset sectors 58 of the baffle in closure member 21, the outset sectors 59 of the baffle in closure member 20, and the remaining stator passages 17, as such appears in Fig. 4. Here again the bleeder openings 65 appear with respect to the baffle element 58. Thus the air entering through the inlet 44 of closure member 20 and directed through certain of the stator passages 17, as hereinabove described, will be directed into the channel 43 in closure member 21 by the inset sectors of the baffle in the latter member, for ultimate discharge through the outlet opening 50 thereof. Also, air under forced draft by the impeller at the left end of the rotor (Fig. 5) is drawn into the channel 42 of closure member 21 through the inlet opening 44 thereof, and in like manner passes to and through others of the stator passages 17 to discharge through the outlet opening 50 of end closure member 20. In this last instance, air-bleeding will occur through the openings 65 exactly as described hereinbefore.

From the foregoing, it will be now readily observed that the present improved cooling and ventilating arrangement provides for oppositely flowing air streams through the motor housing. Further by reason of the alternate disposition of the baffle sectors 58 and 59 in each baffle 54, and the described relative angular displacement of the baffles, the air flow through the longitudinal stator passages 17 about the periphery of the machine stator 6 is such that air streams pass in one direction through one series of these passages, while like air streams pass in the opposite direction through an alternate series of passages 17. Thus the air flow in any adjacent pair of stator passages 17 is substantially equal and opposite, so that the arrangement effects what may be termed an interdigital air flow longitudinally over the stator periphery. The result of this assembly, including the air-bleeding provisions, is a more uniform, effective and efficient cooling of the stator assembly 6, and a more complete ventilation of the motor housing interior. The improved arrangement further affords the provision of a substantially symmetrical, enclosed machine having greatly improved splash-proof and drip-proof characteristics, this by reason of the novel construction of the end closure members 20 and 21 which provide indirect air passages communicating with the machine interior.

To provide for mounting of the machine, the stator frame 12 may be provided with lateral frame projections 66 forming mounting feet 67. In connection with the mounting of the motor, it is to be noted that the end closure members 20 and 21 may be assembled to the frame 12 in any one of several positions angularly about the motor axis, but in the same relative positions so as not to alter the operative relation of the baffles 54 and stator passages 17, whereby to properly position the inlet and outlet openings 44 and 50 of the closure members for maintaining the splash- and drip-proof characteristics of the machine in any mounting position thereof, as on a floor or other horizontal base, a wall or vertical support, or overhead on a ceiling or other overhead support.

A further feature of the present improved construction resides in the substantially identical form and structure of the closure members 20 and 21, which thereby renders them readily interchangeable, end for end, in assembly to the motor frame 12. The advantages thereof are readily apparent, one being that the rotor 7 and its shaft 8 may be thereby reversed without disturbing the frame 12, so as to locate the shaft driving extension 30 at the left end of the motor (Fig. 1) instead of at the right end as shown in the figure referred to.

It will be observed from Fig. 1 in particular, that the machine stator assembly 6 housed within the frame 12, is shown as having a width which is substantially less than the width of the frame between the flanged shoulders 15 thereof. There is thus indicated that stator assemblies of less or greater width may be readily accommodated in the frame as illustrated, with a limitation on the latter as determined by the width of the frame 12. The only change required in the housing structure as herein provided, in order to adapt the same to stator assemblies of varying width, is in respect solely to the baffle members 54. These members would have to be changed, as by removing end portions of the inset sectors 53, or by substituting members having extended sectors 58, so that the ends thereof will define with the assembly rings 10 of the stator assembly of given width, bleeder openings as herein described.

Figure 2:
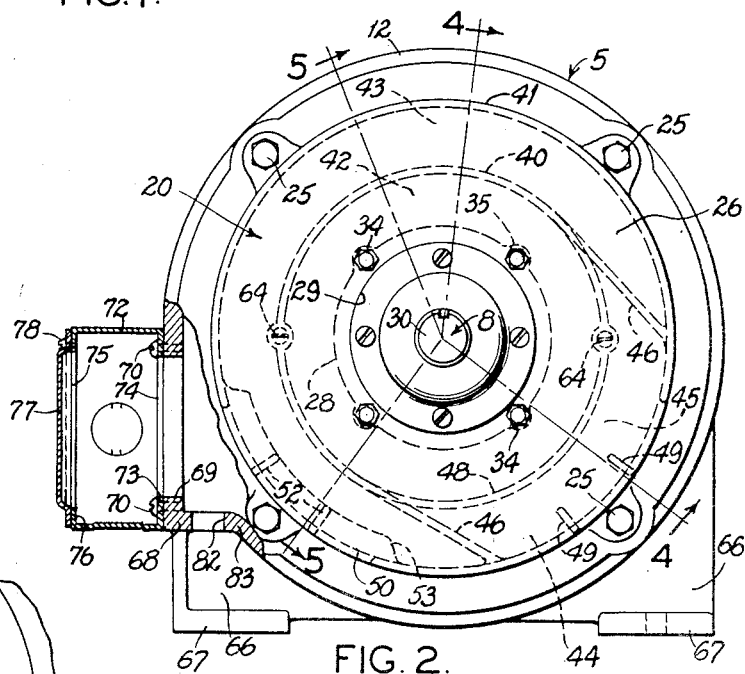
Fig. 2 is an end elevation partly in section, of the machine.
Figure 3:
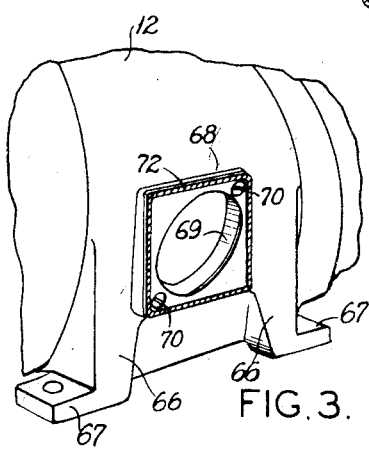
Fig. 3 is a somewhat reduced, fragmentary perspective view of the machine.

As shown by Figs. 1, 2 and 3, provision is made for selective electrical connection to the motor. At one side of the motor frame 12 and between the frame projections 66, is formed a frame boss 68 which is provided with a generally circular opening 69 therein for the passage of conductor leads (not shown) to the frame interior, as for connection to the stator windings 9. Removably attached to the boss 68, as by suitable screws 70, is a conduit box 72, the box having an opening 73 in its rear wall 74 registering with the boss opening 69, and a further opening 75 in its front wall 76. A closure member or cover 77 for the box opening 75 is removably secured over the opening by a screw 78 about which the cover may be pivoted to give access to the box interior, and by a hook-like recess 79 formed in one corner of the cover, for connection with a screw or stud 80. An alternative connection to the motor is provided for by an opening 82 formed in the lower projecting portion 83 of frame boss 68, inwardly of the projections 66 and near the under side of the frame 12 as appears in Fig. 2. The motor leads (not shown) may be directly introduced through opening 82, or one end of a conduit (not shown) containing such leads, may be passed through this opening, as desired. Also, the opening 82 may be tapped (not shown) for threaded connection of a conduit thereto. When the opening 82 is employed in effecting electrical connection to the motor, the conduit box 72 may be and is preferably removed. In such instance the opening 69 may be closed by the box cover 77, as shown in Fig. 3. The advantages are believed apparent in respect to the present provisions for selective conductor connection to the motor, the opening 82 in particular being wholly within the confines of the frame structure, and hence out of the way.

The several enumerated objects and others now readily apparent, are fully attained by the present improved frame construction. Although the invention has been described with respect to only a single preferred embodiment thereof as illustrated by the drawings, it will be understood that alterations or modifications in the several frame parts may be made without departing from the spirit and intended scope of the invention, as defined by the appended claims.

I claim:

1. In a dynamoelectric machine of the character described, having a stator assembly, an annular frame supporting said stator and cooperating therewith to form longitudinally extending frame passages about the stator periphery, frame closure members at the opposite ends of the frame, each having an air-inlet opening and an adjacent air outlet opening, and air flow directing means in said members arranged to provide for air flow from said inlet openings to said outlet openings through alternate sets of said frame passages.

2. In a dynamoelectric machine of the character described, having a stator assembly, an annular frame supporting said stator centrally therein and cooperating with the stator to form longitudinally extending frame passages equally spaced about the stator periphery, frame closure members at the opposite ends of the frame, each having an air inlet opening and an adjacent air outlet opening, said members being provided with wall elements arranged to provide for separate air flow from said inlet openings to said outlet openings through alternate sets of said frame passages.

3. In a dynamoelectric machine having a stator and a rotor operatively associated therewith, an annular frame supporting said stator and cooperating therewith to form longitudinally extending frame passages equally spaced about the stator periphery, frame closure members at the opposite ends of the frame adapted for the rotational support of said rotor, said members each having a localized air inlet and a localized air outlet therein, air flow directing means on said members arranged to provide for air flow from the air inlet of one member to the air outlet of the other member through alternate frame passages, and air impeller means on said rotor.

4. In a dynamoelectric machine having a stator and a rotor operatively associated therewith, an annular frame supporting said stator and cooperating therewith to form longitudinally extending frame passages equally spaced about the stator periphery, substantially identical frame closure members at the opposite ends of the frame adapted for the rotational support of said rotor, said members having adjacent localized air inlet and outlet openings and being provided with wall and baffle means arranged to provide air flow communication between said openings and said frame passages, and air impeller means on said rotor.

5. In a dynamoelectric machine having a stator assembly, an annular frame supporting the stator and cooperating therewith to form longitudinally extending frame passages about the stator periphery, frame closure members at the opposite ends of the frame, each having adjacent localized air inlet and outlet openings, each of said members being provided with wall and baffle means arranged to provide separate air flow communication between the inlet opening of one member and certain of said frame passages, and between the outlet opening of said one member and others of said frame passages.

6. In a dynamoelectric machine having a stator assembly, an annular frame supporting the stator and cooperating therewith to form longitudinally extending frame passages spaced about the stator periphery, and substantially identical frame closure members at the opposite ends of the frame, each having adjacent localized air inlet and outlet openings and being provided with baffle means therein affording communication between said openings and the frame passages, the baffle means in one member providing for air flow between the inlet opening of the member and one set of alternate frame passages and between the outlet opening of the member and a second set of alternate frame passages, while the baffle means in the other member provides for air flow between the inlet opening of the member and said second set of alternate frame passages and between the outlet opening of the member and said one set of alternate frame passages.

7. In a dynamoelectric machine of the character described, including a stator assembly, a frame supporting said stator and cooperating therewith to form longitudinally extending frame passages about the stator periphery, an end closure member for said frame, provided with a localized air inlet opening and an adjacent localized air outlet opening, wall-forming means in said member arranged to provide separate channels communicating with said openings, and a baffle element carried by said member and cooperating with said channels and frame passages to provide for air flow from said inlet opening through its associated channel, over the adjacent end portion of said stator assembly and thence into certain of said frame passages, and for air flow between others of said frame passages and said outlet opening through its associated channel.

8. In a dynamoelectric machine of the character described, including a stator and a rotor, a frame supporting said stator centrally therein and cooperating with the stator to provide a plurality of longitudinally extending frame passages spaced about the stator periphery, a hollow end closure member for said frame, provided with adjacent localized air inlet and outlet openings in a side portion thereof, wall-forming means arranged in said member to form separate channels one in communication with the inlet opening and the other in communication with the outlet opening, air impelling means on said rotor, and baffle means carried by said member and cooperating with said channels and frame passages to provide for air flow communication between said channel associated with said inlet opening, said impelling means and certain of said frame passages, and between others of said frame passages and the channel associated with said outlet opening.

9. In a dynamoelectric machine of the character described, including a stator and a rotor, an annular frame supporting said stator and cooperating therewith to form a plurality of longitudinally extending frame passages equally spaced about the stator periphery, substantially identical closure members at the opposite ends of the frame, adapted for rotatably supporting said rotor, air impelling means on each end of said rotor, each of said members being provided with adjacent localized air inlet and outlet openings, wall elements in each member arranged to provide separate channels one communicating with each of the openings, baffle means in each member separating the channels therein and arranged for air flow directing cooperation with said frame passages, said baffle means in each member being adapted for directing air flow from the channel associated with the inlet opening of the member, to the adjacent one of said impelling means and thence toward and into one set of said frame passages, and for directing air flow from an alternate set of said frame passages directly into the channel associated with the outlet opening of the member.

GORDON R. ANDERSON.